United States Patent
Yeh et al.

(10) Patent No.: US 8,398,410 B2
(45) Date of Patent: Mar. 19, 2013

(54) SOCKET CONNECTOR HAVING CARBON NANOTUBE CONTACTS FOR SIGNAL TRANSMISSION AND METALLIC CONTACTS FOR POWER TRANSMISSION

(75) Inventors: Cheng-Chi Yeh, New Taipei (TW); Andrew Cheng, New Taipei (TW)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 0 days.

(21) Appl. No.: 13/210,377

(22) Filed: Aug. 16, 2011

(65) Prior Publication Data

US 2012/0045911 A1     Feb. 23, 2012

(30) Foreign Application Priority Data

Aug. 20, 2010   (TW) ............................... 99216035 U

(51) Int. Cl.
*H01R 12/00*     (2006.01)

(52) U.S. Cl. ....................................................... 439/71

(58) Field of Classification Search ................... 439/71, 439/70, 79, 345, 66, 83
See application file for complete search history.

(56) References Cited

U.S. PATENT DOCUMENTS

| | | | |
|---|---|---|---|
| 6,271,482 B1 * | 8/2001 | Crotzer et al. | 174/262 |
| 6,390,827 B1 * | 5/2002 | Howell et al. | 439/70 |
| 6,626,684 B1 | 9/2003 | Stickler et al. | |
| 6,948,946 B1 * | 9/2005 | Ju | 439/71 |
| 7,083,456 B2 * | 8/2006 | Trout et al. | 439/326 |

FOREIGN PATENT DOCUMENTS

TW    M393080    11/2010

* cited by examiner

*Primary Examiner* — Edwin A. Leon
*Assistant Examiner* — Harshad Patel
(74) *Attorney, Agent, or Firm* — Wei Te Chung; Ming Chieh Chang

(57) ABSTRACT

A socket connector includes a housing having a base and a plurality of sidewalls extending upwardly from the base. The base and the sidewalls define a receiving cavity for receiving an electronic package. A plurality of carbon nanotube contacts for signal transmission and a plurality of metallic contacts for power transmission are mounted within the housing respectively.

11 Claims, 6 Drawing Sheets

SOCKET CONNECTOR HAVING CARBON NANOTUBE CONTACTS FOR SIGNAL TRANSMISSION AND METALLIC CONTACTS FOR POWER TRANSMISSION

BACKGROUND OF THE INVENTION

1. Field of the Invention

The present invention relates to a socket connector, and more particularly to a socket connector having carbon nanotube contacts for signal transmission and metallic contacts for power transmission.

2. Description of Related Art

A carbon nanotube contact is currently used to take place of conventional metallic contact for building electrical connection between two electronic devices, such as an electronic package and a PCB (Printed Circuit Board). U.S. Pat. No. 6,626,684 issued to Stickler et al. on Sep. 30, 2003 discloses a so-called carbon nanotube socket which includes a base configured with a plurality of through holes, and a plurality of carbon nanotube contacts received in the through holes respectively. The carbon nanotube contact is made of polymeric materials or a mixture of polymeric material and metal material, and is able to deliver both signal and power. Carbon nanotube socket has a low profile and thus meets the trend of miniaturization of an electronic device.

However, carbon nanotube contact has a relative large resistance and is thus not proper for transmission of large current.

In view of the above, an improved socket connector is desired to overcome the above-mentioned problem.

SUMMARY OF THE INVENTION

Accordingly, an object of the present invention is to provide a socket connector having particular contacts adapted to transmit power of large current.

According to one aspect of the present invention there is provided a socket connector which includes a housing having a base and a plurality of sidewalls extending upwardly from the base. The base and the sidewalls define a receiving cavity for receiving an electronic package. A plurality of carbon nanotube contacts for signal transmission and a plurality of metallic contacts for power transmission are mounted within the housing respectively.

Other objects, advantages and novel features of the invention will become more apparent from the following detailed description when taken in conjunction with the accompanying drawings, in which:

DETAILED DESCRIPTION OF THE INVENTION

Reference will now be made to the drawings to describe the present invention in detail.

Figure 1:
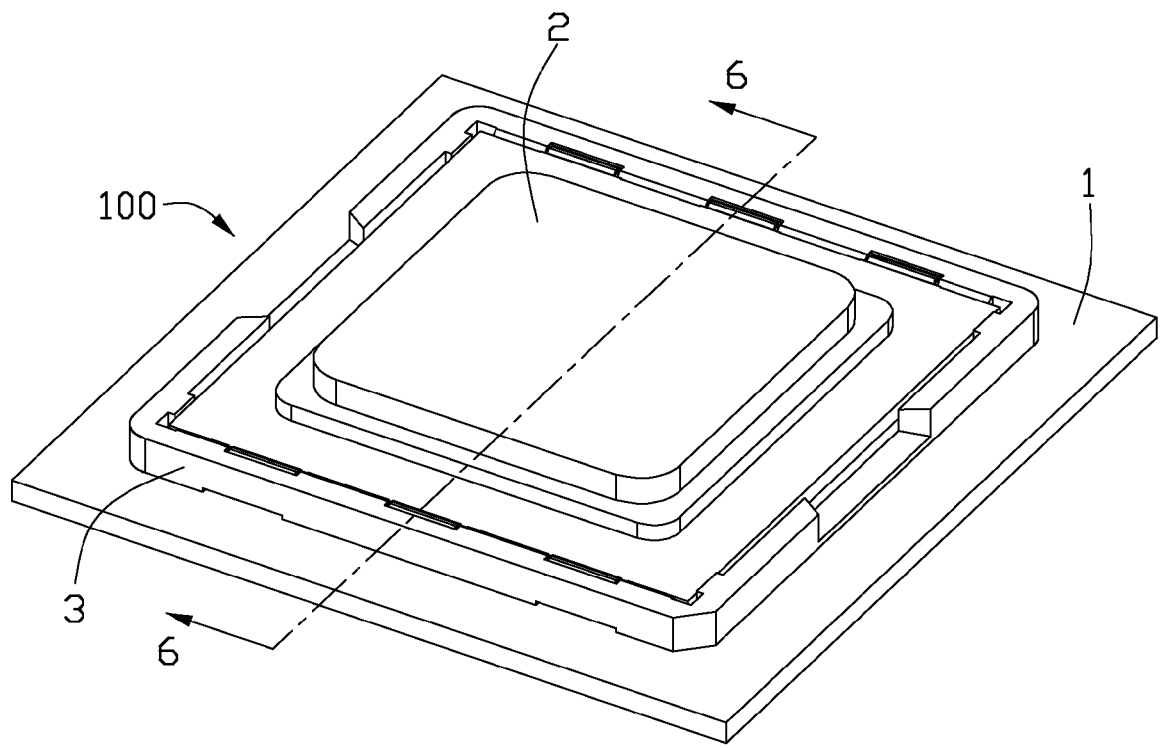
FIG. 1 is an assembled, perspective view of a socket connector in accordance with a preferred embodiment of the present invention together with an electronic package and a PCB.
Figure 2:
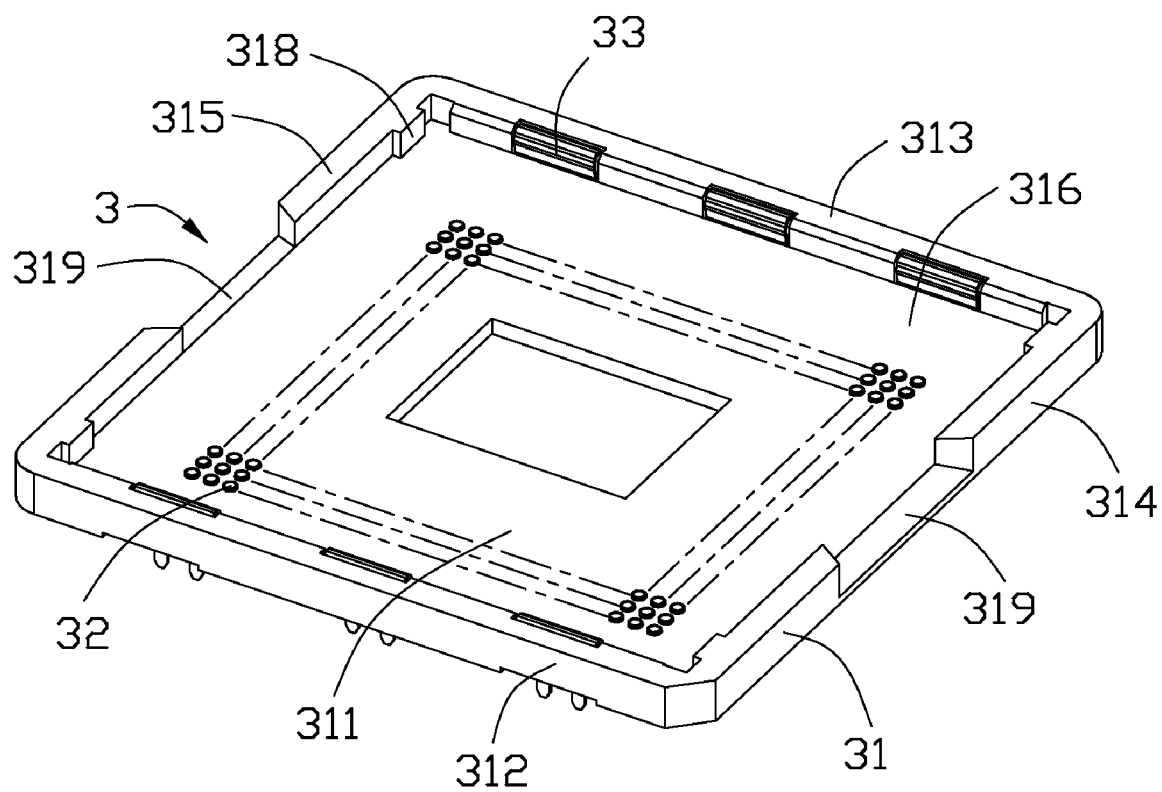
FIG. 2 is an assembled, perspective view of the socket connector as shown in FIG. 1.
Figure 3:
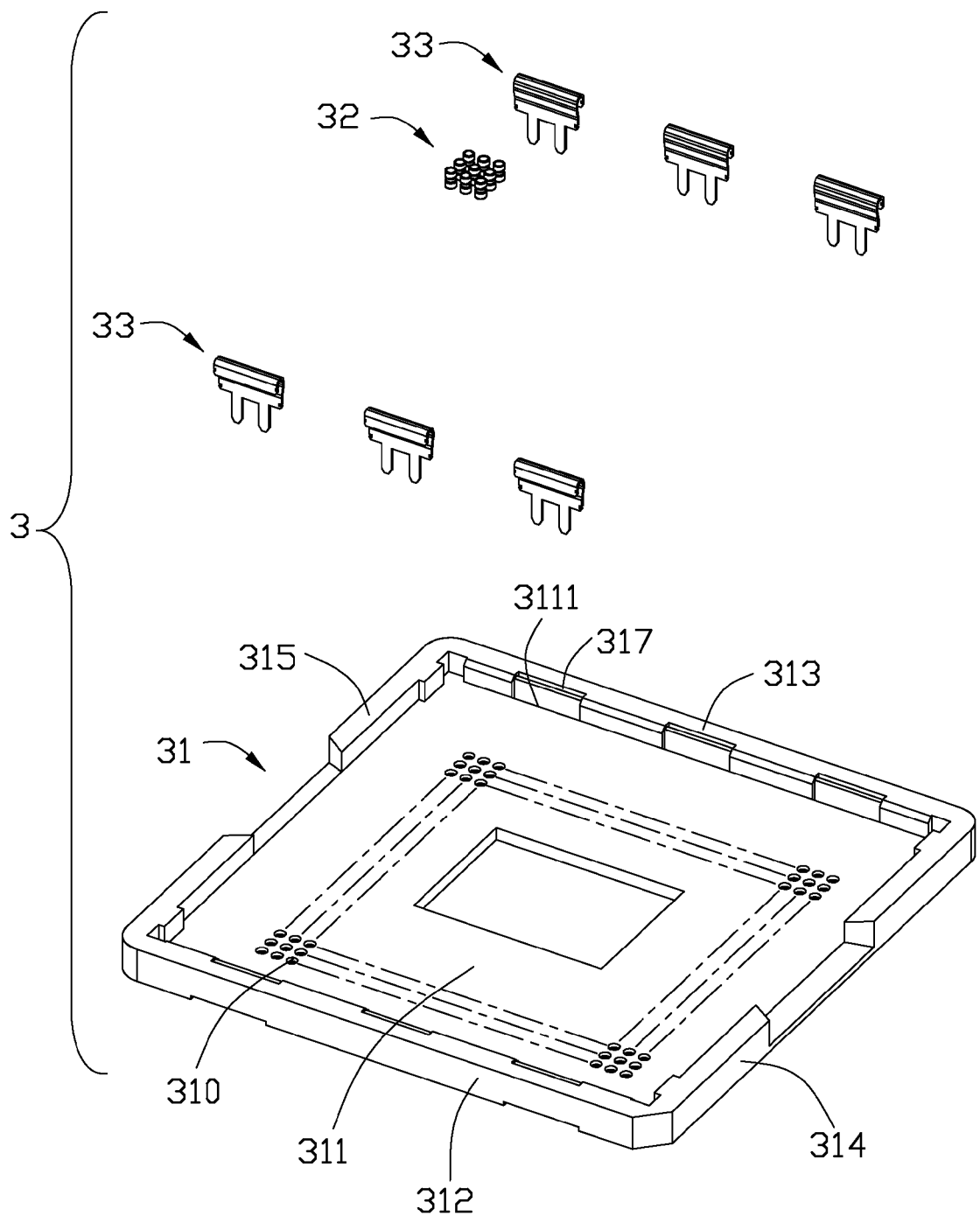
FIG. 3 is an exploded, perspective view of the socket connector as shown in FIG. 1.
Figure 6:
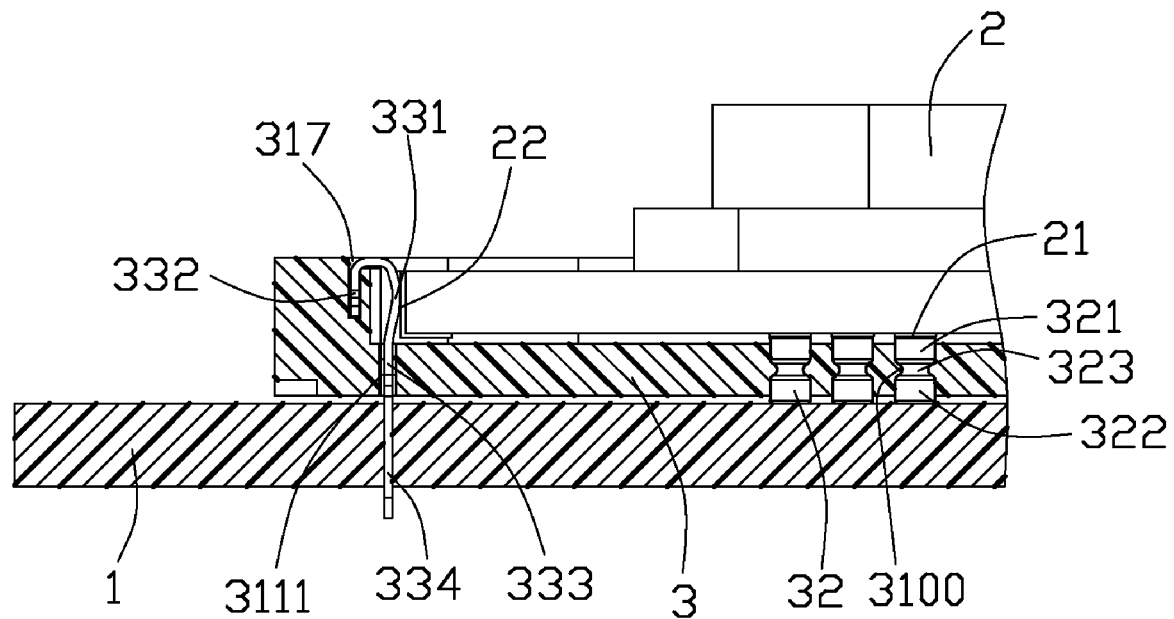
FIG. 6 is a cross-sectional view taken along the line 6-6 labeled in FIG. 1.

Referring to FIG. 1 to FIG. 3, a socket connector 3 is made in accordance with a preferred embodiment of the present invention. The socket connector 3 interconnects an electronic package 2 and a PCB 1, and they jointly constitute an electrical connection assembly 100. Referring to FIG. 6, the electronic package 2 includes a plurality of signal pads 21 at a bottom surface thereof and a plurality of power pads 22 located at outer surfaces thereof.

The socket connector 3 includes an insulative housing 31 and a plurality of carbon nanotube contacts 32 and metal metallic contacts 33 mounted within the housing 31. The housing 31 further includes a base 311 and a first sidewall 312, a second sidewall 313, a third sidewall 314 and a forth sidewall 315 extending upwardly from periphery of the base 311. The base 311 is formed with an array of through holes 310 and the carbon nanotube contacts 32 are received in the through holes 310 respectively. The base 311 and the sidewalls 312, 313, 314, 315 jointly define a receiving cavity 316 for receiving the electronic package 2. Opposing first and second sidewalls 312, 313 are respectively formed with a blind retaining slot 317. Opposing third and forth sidewalls 314, 315 are respectively provided thereon with a protrusion 318 extending toward the receiving cavity 316. The protrusion 318 positions the electronic package 2 in the cavity 316. The third and forth sidewalls 314, 315 are also formed with a notch 319 respectively which make it easy for taking the electronic package 2 out of the housing 31.

Figure 4:
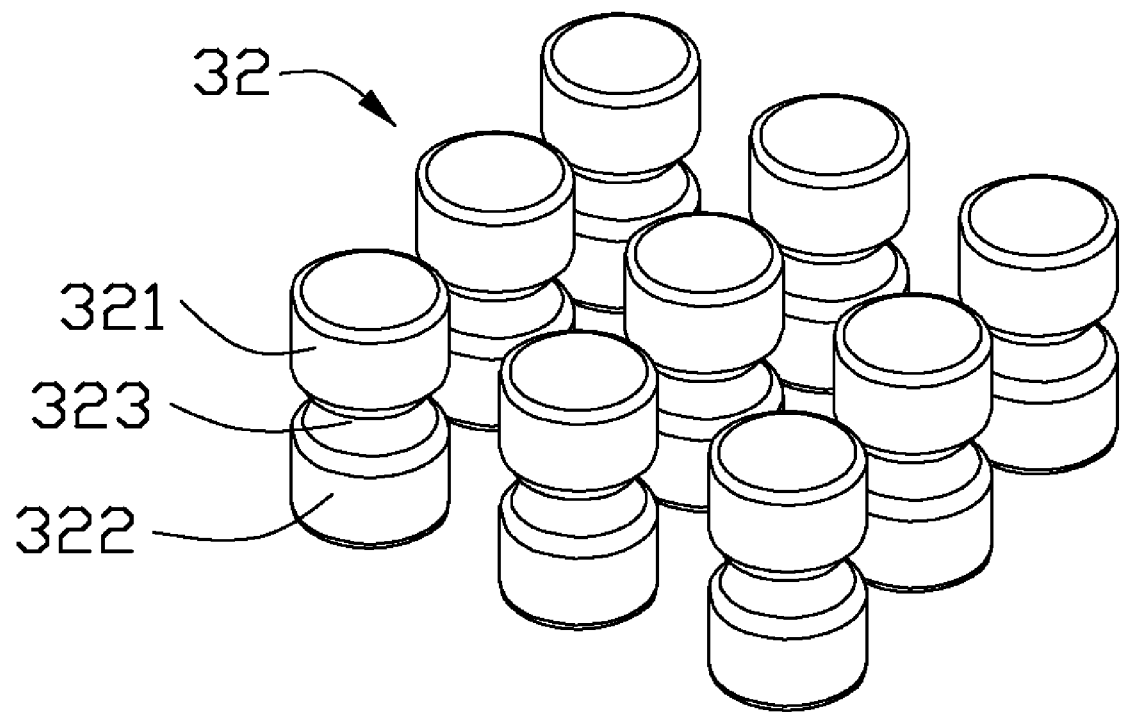
FIG. 4 is an enlarged view of a carbon nanotube contact as shown in FIG. 1.

Referring to FIG. 4 and FIG. 6, The carbon nanotube contact 32 is made of polymeric materials or a mixture of polymeric material and metal material, and is configured to be deformable. The carbon nanotube contacts 32 are received in the through holes 310 of the base 311, and contact with the signal pads 21 of the electronic package 2 respectively for transmitting signals when the electronic package 2 is loaded onto the socket connector 3. Each carbon nanotube contact 32 is formed with substantially cylindrical shapes, and includes opposite first and second contacting ends 321, 322, of which the first contacting end 321 engages and contact with the signal pads 21 of the electronic package 2, and the second end 322 engages and contacts with the PCB 1. A neck portion 323 shrinks inwardly from a middle portion of the carbon nanotube contact 32. A protrusion 3100 is formed in the trough hole 310 and engaged with the neck portion 323 so as to securely retain the carbon nanotube contact 32 within the through hole 310.

Figure 5:
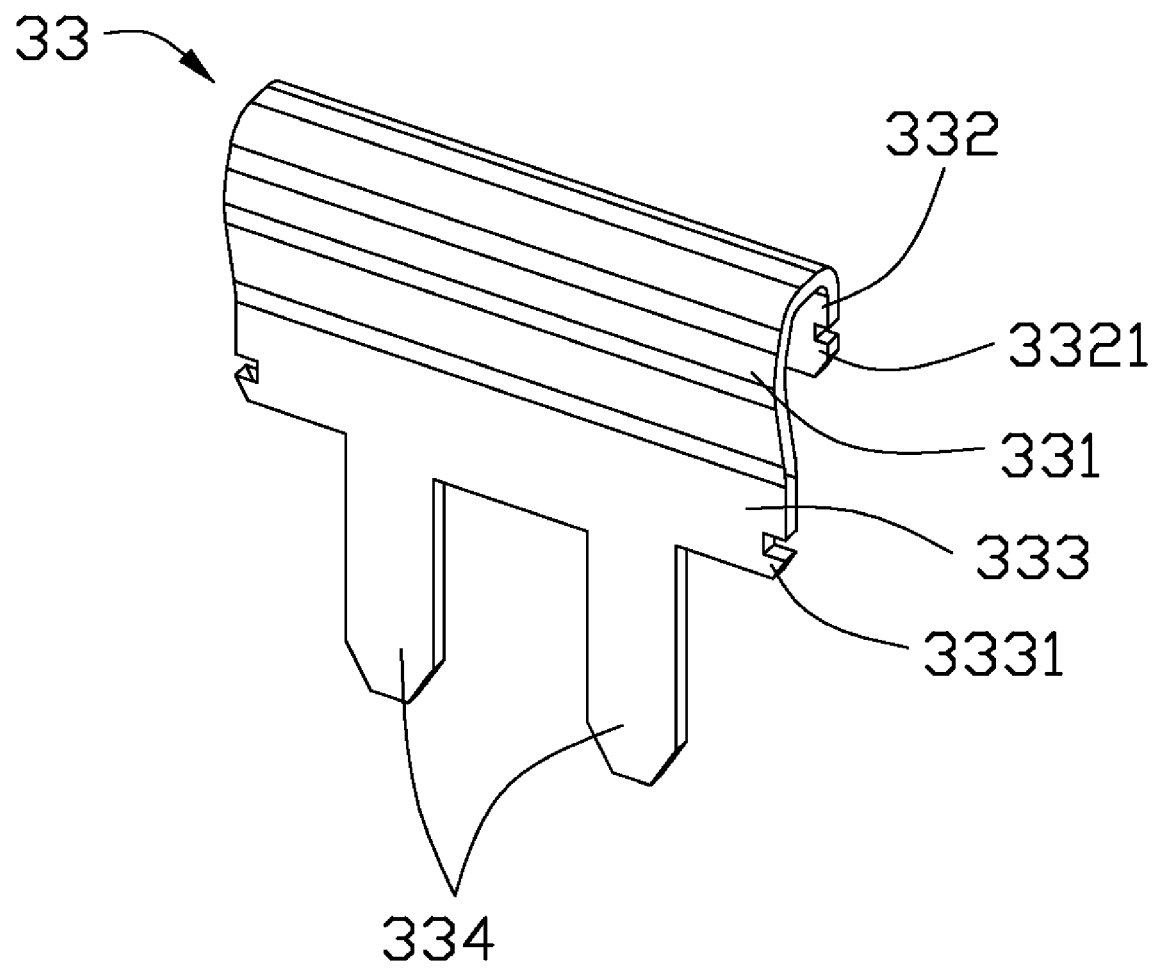
FIG. 5 is an enlarged view of a metallic contact as shown in FIG. 1.

Particularly referring to FIG. 5 and FIG. 6, the metallic contacts 33 are made of metal material, especially Copper or Copper-alloy. The metallic contacts 33 are respectively mounted with the first and second sidewalls 312, 313, and engage and contact with the power pads 22 of the electronic package 2 for power transmission when the electronic package 2 is loaded onto the socket connector 3.

The metallic contact 33 is made by stamping and bending a metal sheet. The metallic contact 33 has an elastic engaging portion 331 protruding toward the receiving cavity 316, a latching portion 332 extending upwardly from the engaging portion 331, a retaining portion 333 extending downwardly from the engaging portion 331, and a pair of legs 334 extending downwardly from the retaining portion 333. The engaging portion 331 contact with the power pad 22 of the electronic package 2 for transmitting power and securing the electronic package 2 as well. The latching portion 332 extends downwardly and has barbs 3321 at opposite sides thereof. The latching portion 332 is inserted into and retained in the retaining slot 317. A plurality of apertures 3111 are additionally formed in the base 311 of the housing 31. The retaining portion 333 of the metallic contact 33 has barbs 3331 at opposite sides thereof to be engaged with the aperture 3111. The leg 334 extends downward beyond a bottom surface of the base 311 and then passes through the PCB 1 so as to be soldered together with the PCB 1.

While preferred embodiments in accordance with the present invention has been shown and described, equivalent modifications and changes known to persons skilled in the art according to the spirit of the present invention are considered within the scope of the present invention as defined in the appended claims.

What is claimed is:

1. An electrical connection assembly, comprising:
    an electronic package has a plurality of signal pads at a bottom surface thereof and a plurality power pads at a pair of opposite outer surfaces thereof; and
    a socket connector comprising a housing with a plurality of carbon nanotube contacts engaged with the signal pads of the electronic package for signal transmission and metallic contacts engaged with the power pads of the electronic package for power transmission; wherein
    the housing comprises a base and a plurality of sidewalls extending upwardly from the base, the base and the sidewalls defining a receiving cavity receiving the electronic package; wherein
    when the electronic package is vertically downwardly assembled into the housing, the signal pads of the electronic package and the corresponding carbon nanotube abut against each other in a vertical direction without retention therebetween while said sidewalls commonly define a closed boundary to circumferentially surround and retain said electronic package in position; wherein
    there are first and second pairs of said sidewalls, the first pair of sidewalls opposite to each other, are equipped with the metal contacts thereon not only for electrical transmission but also mechanical retention with regard to the electronic package while the second pair of sidewalls opposite to each other, are equipped with no metal contacts for electrical transmission but only with alignment protrusions for mechanical retention with regard to the electronic package; wherein
    said second pair of sidewalls define therein a pair of notches, respectively, for grasping another pair of opposite outer surfaces of the electronic package during vertically assembling or disassembling the electronic package with regard to the housing.

2. The electrical connection assembly as claimed in claim 1, the base has a plurality of through holes, and the carbon nanotube contacts are received in the through holes respectively.

3. The electrical connection assembly as claimed in claim 1, wherein the metallic contacts are mounted with the sidewalls of the housing.

4. The electrical connection assembly as claimed in claim 3, wherein the metallic contact includes an elastic engaging portion protruding toward the receiving cavity.

5. The electrical connection assembly as claimed in claim 3, wherein the metallic contact includes a retaining portion retained in an aperture defined in the base of the housing.

6. The electrical connection assembly as claimed in claim 3, wherein the metallic contact includes a latching portion located behind the engaging portion and inserted into a retaining slot defined in the sidewall of the housing.

7. The socket connector as claimed in claim 1, wherein the carbon nanotube contact is formed with a substantially cylindrical shape and has a neck portion shrinking inwardly from a middle position thereof.

8. A socket connector comprising:
    an insulative housing defining an upward package receiving cavity surrounded by a plurality of side walls and a base for receiving an electronic package;
    a plurality of first contacts disposed in the base for signal transmission;
    a plurality of second contacts arranged along a periphery region of the housing, each of said second contacts including a mounting section extending through the base and an upper section disposed in the corresponding side wall, and an engaging section exposed upon an interior face of the corresponding side wall for mechanical and electrical engagement with a side face of the electronic package; wherein
    there are four side walls on the housing to form a closed boundary, and two opposite side walls are equipped with the corresponding second contacts to have the corresponding engaging section exposed upon the corresponding interior faces while the other two opposite side walls are unitarily formed with alignment protrusions on the corresponding interior faces without any contacts exposed thereon; wherein
    the first contacts provide no retention to the electronic package while the second contacts cooperate with the alignment protrusions to provide circumferential retention to the electronic package; wherein
    said other two opposite side walls are further equipped with corresponding notches therein for grasping electronic package during vertical assembling or disassembling of the electronic package with regard to the housing.

9. The socket connector as claimed in claim 8, wherein the mounting section of each of the second contacts is dimensioned to be long enough for insertion into a corresponding through hole in a printed circuit board upon which the housing is seated.

10. The socket connector as claimed in claim 8, wherein an upper portion of the mounting section is equipped with a latching structure to retain the second contact to the base.

11. The socket connector a claimed in claim 8, wherein the upper section is equipped with a latch structure to retain the second contact to the corresponding side wall.

* * * * *